(12) United States Patent
Maag et al.

(10) Patent No.: US 8,264,466 B2
(45) Date of Patent: Sep. 11, 2012

(54) TOUCH SCREEN HAVING REDUCED VISIBILITY TRANSPARENT CONDUCTOR PATTERN

(75) Inventors: Jonathan P. Maag, New Berlin, WI (US); Joseph C. Spang, Minneapolis, MN (US); Brian E. Aufderheide, Cedarburg, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 1442 days.

(21) Appl. No.: 11/278,166

(22) Filed: Mar. 31, 2006

(65) Prior Publication Data

US 2007/0236618 A1    Oct. 11, 2007

(51) Int. Cl.
*G06F 3/041* (2006.01)
*G02B 1/10* (2006.01)
*G03F 1/00* (2006.01)
*G03F 7/00* (2006.01)

(52) U.S. Cl. ........ 345/173; 359/580; 359/582; 359/585; 430/321

(58) Field of Classification Search .......... 345/173–179, 345/182, 183, 204–215, 690–699
See application file for complete search history.

(56) References Cited

U.S. PATENT DOCUMENTS

| | | | |
|---|---|---|---|
| 4,198,539 A | 4/1980 | Pepper, Jr. |
| 4,308,316 A | 12/1981 | Gordon |
| 4,371,746 A | 2/1983 | Pepper, Jr. |
| 4,595,634 A | 6/1986 | Gordon |
| 4,714,631 A | 12/1987 | Aufderheide |
| 4,715,686 A | 12/1987 | Iwashita et al. |
| 4,786,767 A | 11/1988 | Kuhlman |
| 4,789,767 A | 12/1988 | Doljack |
| 4,847,157 A | 7/1989 | Goodman et al. |
| 4,853,257 A | 8/1989 | Henery |
| 4,895,630 A | 1/1990 | Aufderheide |
| 4,946,712 A | 8/1990 | Goodman et al. |
| 5,007,085 A | 4/1991 | Greanias et al. |
| 5,386,219 A | 1/1995 | Greanias et al. |
| 5,556,694 A | 9/1996 | Austin |

(Continued)

FOREIGN PATENT DOCUMENTS

EP    1172831    1/2002

(Continued)

OTHER PUBLICATIONS

3M Engineered Adhesives Division, "Optically Clear Laminating Adhesives", Jun. 2001.

*Primary Examiner* — Bipin Shalwala
*Assistant Examiner* — Ryan A Lubit
(74) *Attorney, Agent, or Firm* — Steven A. Bern (57) ABSTRACT

Disclosed is a transparent touch screen construction that includes a pattern of layer stacks disposed on a substrate. The layer stacks each include a transparent conductor layer and an intermediate layer positioned between the substrate and the transparent conductor layer. The intermediate layer has a refractive index that is lower than that of the transparent conductor layer and that of the substrate. The construction of the layer stacks reduces the difference in visible light transmission between the areas of the substrate covered by the stacks and the areas of the substrate left exposed by the stacks. Also disclosed are methods for reducing the visibility of a patterned transparent conductor in a touch screen by disposing an intermediate layer pattern between a substrate and a transparent conductor pattern, the intermediate layer pattern and transparent conductor pattern being coincident.

28 Claims, 5 Drawing Sheets

U.S. PATENT DOCUMENTS

| | | | |
|---|---|---|---|
| 5,573,335 | A | 11/1996 | Schinazi |
| 5,650,597 | A | 7/1997 | Redmayne |
| 5,773,086 | A | 6/1998 | McCurdy et al. |
| 5,792,550 | A | 8/1998 | Phillips et al. |
| 5,844,506 | A | 12/1998 | Binstead |
| 5,846,649 | A | 12/1998 | Knapp et al. |
| 5,869,129 | A | 2/1999 | Aben et al. |
| 6,048,796 | A | 4/2000 | Wang et al. |
| 6,087,012 | A | 7/2000 | Varaprasad et al. |
| 6,106,892 | A | 8/2000 | Ye |
| 6,188,391 | B1 | 2/2001 | Seely et al. |
| 6,248,397 | B1 | 6/2001 | Ye |
| 6,266,193 | B1 | 7/2001 | Saif et al. |
| 6,319,594 | B1 | 11/2001 | Suzuki et al. |
| 6,395,863 | B2 | 5/2002 | Geaghan et al. |
| 6,476,783 | B2 | 11/2002 | Matthies et al. |
| 6,480,250 | B1 | 11/2002 | Matsufuji et al. |
| 6,483,498 | B1 | 11/2002 | Colgan et al. |
| 6,507,337 | B1 * | 1/2003 | Sato et al. .................... 345/173 |
| 6,512,512 | B1 | 1/2003 | Blanchard |
| 6,522,322 | B1 | 2/2003 | Maeda et al. |
| 6,583,935 | B1 * | 6/2003 | Saif et al. .................... 359/582 |
| 6,628,355 | B1 | 9/2003 | Takahara |
| 6,677,703 | B2 | 1/2004 | Ito et al. |
| 6,686,546 | B2 | 2/2004 | Chiu |
| 6,688,186 | B2 | 2/2004 | Chae |
| 6,689,544 | B2 * | 2/2004 | Nagarkar et al. ............ 430/321 |
| 6,720,955 | B2 * | 4/2004 | Sugawara et al. ............ 345/173 |
| 6,727,566 | B1 | 4/2004 | Fukui et al. |
| 6,762,752 | B2 | 7/2004 | Perski et al. |
| 6,787,240 | B2 | 9/2004 | Getz |
| 6,813,957 | B1 | 11/2004 | Platz |
| 6,838,013 | B2 | 1/2005 | Lennhoff et al. |
| 6,896,981 | B2 | 5/2005 | Iwabuchi et al. |
| 6,961,049 | B2 | 11/2005 | Mulligan et al. |
| 6,970,160 | B2 | 11/2005 | Mulligan et al. |
| 6,987,354 | B2 | 1/2006 | Arakawa et al. |
| 7,030,860 | B1 | 4/2006 | Hsu et al. |
| 7,151,532 | B2 | 12/2006 | Schulz |
| 7,372,510 | B2 | 5/2008 | Abileah |
| 2001/0028343 | A1 | 10/2001 | Bottari et al. |
| 2001/0055673 | A1 | 12/2001 | Getz |
| 2002/0086188 | A1 | 7/2002 | Halsey, IV et al. |
| 2002/0101410 | A1 | 8/2002 | Sakata et al. |
| 2002/0155299 | A1 | 10/2002 | Harris et al. |
| 2002/0167629 | A1 | 11/2002 | Blanchard |
| 2002/0180710 | A1 | 12/2002 | Roberts |
| 2003/0071794 | A1 | 4/2003 | Arakawa et al. |
| 2003/0103043 | A1 | 6/2003 | Mulligan et al. |
| 2003/0203101 | A1 | 10/2003 | Haubrich et al. |
| 2003/0222857 | A1 | 12/2003 | Abileah |
| 2004/0017362 | A1 | 1/2004 | Mulligan et al. |
| 2004/0130536 | A1 * | 7/2004 | Tanabe .......................... 345/173 |
| 2005/0083307 | A1 | 4/2005 | Aufderheide et al. |
| 2006/0038790 | A1 * | 2/2006 | Chen et al. .................... 345/173 |
| 2006/0209045 | A1 * | 9/2006 | Su et al. ........................ 345/173 |
| 2007/0030254 | A1 * | 2/2007 | Robrecht et al. ............. 345/173 |
| 2007/0202660 | A1 * | 8/2007 | Moriceau et al. ............. 438/424 |

FOREIGN PATENT DOCUMENTS

| | | | |
|---|---|---|---|
| GB | 2355273 | A | 4/2001 |
| JP | 07-315880 | | 12/1995 |
| JP | 08-138446 | | 5/1996 |
| JP | 2763472 | | 6/1998 |
| WO | WO 01/27868 | | 4/2001 |
| WO | WO 01/52416 | | 7/2001 |
| WO | WO 02/29830 | A1 | 4/2002 |
| WO | WO 02/100074 | | 12/2002 |
| WO | WO 2006/007071 | | 1/2006 |

* cited by examiner

TOUCH SCREEN HAVING REDUCED VISIBILITY TRANSPARENT CONDUCTOR PATTERN

This disclosure relates to touch screens, and particularly to on-display touch screens that utilize a pattern of transparent conductors as the touch sensing elements.

BACKGROUND

Touch screens have become an increasingly common way for users to intuitively interact with electronic systems, typically those that include displays for viewing information. Transparent touch screens can be disposed over variable displays and/or static images so that the displayed information and images can be viewed through the touch screen. Touch screen technologies suitable for use in such configurations include resistive, capacitive, projected capacitive, inductive, surface acoustic wave, force, and others. Many projected capacitive and inductive touch screens utilize a pattern of conductors as the sensing elements. The term "projected capacitive" refers to the ability of the pattern of conductors to project a field through a relatively thick dielectric such as a thin glass panel, the glove of a gloved finger, and so forth. Inductive touch screens include those that induce a field that excites a resonant circuit, for example in a stylus, that can radiate and couple to the pattern of conductors.

SUMMARY OF THE INVENTION

The present invention provides a transparent touch screen construction that includes a substrate and a plurality of layer stacks disposed on the substrate leaving areas of the substrate exposed and areas of the substrate covered by the stacks. Each layer stack has a construction that includes a transparent conductor layer and an intermediate layer, the intermediate layer disposed between the substrate and the transparent conductor layer, the intermediate layer having an index of refraction that is less than that of the transparent conductor layer and less than that of the substrate. The stacks are designed so that the difference in visible light transmission through the areas covered by the stacks and the areas exposed by the stacks has a maximum of about 1% or less and an average of about 0.5% or less. The transparent touch screen further includes a plurality of lead lines electrically connected to the transparent conductor layers and configured for connecting to controller electronics adapted to determine touch input information based on signals received when a touch input is coupled to the transparent conductors.

In some embodiments, the transparent touch screen construction can include additional layers in the layer stacks, filler materials (such as an optical adhesive) disposed over the substrate and the layer stacks, additional substrate(s) laminated to the construction (for example, using an optical adhesive filler material as the laminating adhesive) where the additional substrate(s) may also include sensing elements composed of layer stacks similar to those described above.

The present invention also provides touch input systems that include transparent touch screen overlays viewable through a display device, for example a touch input monitor, a point of sale terminal, a public kiosk, a handheld device, a table PC, or the like.

The present invention further provides methods for reducing the visibility of a patterned transparent conductor in a touch screen. The steps include patterning a transparent conductor on a substrate, and patterning an intermediate layer between the substrate and the patterned transparent conductor, where the transparent conductor pattern and the intermediate layer pattern coincide. The intermediate layer has an index of refraction that is less than that of the substrate and less than that of the patterned transparent conductor.

The above summary is not intended to describe each embodiment or every implementation of the present disclosure. Advantages and attainments, together with a more complete understanding of the invention, will become apparent and appreciated by referring to the following detailed description and claims taken in conjunction with the accompanying drawing.

BRIEF DESCRIPTION OF THE DRAWINGS

The invention may be more completely understood in consideration of the following detailed description of various embodiments of the invention in connection with the accompanying drawings, in which.

DETAILED DESCRIPTION

The present disclosure is related to touch screens, particularly to touch screens that utilize a pattern of transparent conductors as sensing elements, and even more particularly to such touch screens that are transmissive of visible light so that an image can be viewed through the touch screen, for example on-display (or transparent) touch screens. Many touch screens utilize transparent conductors as sensing elements, and these elements can be provided as a continuous coating or in a pattern such as spaced apart stripes, lines, pads, grids and the like. Transparent conductors generally have optical properties that can lead to reflections (for example due to an index of refraction difference between the transparent conductor and the underlying substrate), lower transmission (for example due to absorption and reflection of light), and coloration (for example due to preferential absorption over a particular range of wavelengths in the visible spectrum). When the transparent conductor is provided as a single continuous coating, such optical effects may not be apparent if the coating is relatively uniform across the viewable area of the device. In devices that use a transparent conductor pattern, it may be possible to distinguish the areas covered by the pattern from the areas not covered by the pattern due to a difference in optical effects. This can be distracting to the user, and in some applications may be undesirable from an aesthetic point of view or can even interfere with information and images being shown by the display. Particularly in environments where the device may be exposed to high ambient light conditions, the transparent conductor pattern of the touch sensor device may be undesirably visible when the underlying display is on or off.

The present disclosure involves patterning or otherwise providing a plurality of layer stacks on a substrate. Each layer stack includes a transparent conductor layer and a lower refractive index intermediate layer arranged between the substrate and the transparent conductor. Additional layers can be included in the layer stacks, for example an overlayer disposed so that the transparent conductor layer is between the overlayer and the intermediate layer. The intermediate layer has a refractive index lower than that of the transparent conductor layer. The thicknesses of the transparent conductor layer and intermediate layer can be selected so that the layer stack provides antireflective characteristics such that the transmission of visible light through the stacks is nearly that of the transmission of visible light through the areas left uncovered by the stacks. For example, over the visible spectrum, the maximum difference between the percentage transmission through the areas uncovered by the stacks and the areas covered by the stacks can be about 1% or less, and the average difference between the percentage transmission through the areas uncovered by the stacks and the areas covered by the stacks can be about 0.5% or less, preferably 0.3% or less. This can help ensure little or no user visibility of the transparent conductor pattern under normal operating conditions.

In exemplary constructions according to the present disclosure, the substrate(s), intermediate layer, optional overlayer, optional filler material, optional adhesive, and the like are substantially transparent in the visible spectrum. Suitable substrates can include glass and various plastic materials such as polyethylene terapthalate (PET), various acrylics, polycarbonate, and any other substrate suitable for use in display applications whether now known or later developed. Suitable transparent conductor materials include transparent conductive oxides such as indium tin oxide (ITO), tin antimony oxide (TAO), other doped tin oxides, and the like. Suitable transparent conductor materials also include conductive polymer materials such as polypyrrole, polyaniline, polyacetylene, polythiophene, polyphenylene vinylene, polyphenylene sulfide, poly p-phenylene, polyheterocycle vinylene. For example, an exemplary conductive polymer is a substituted polythiophene, poly (3,4-ethylenedioxythiophene), often referred to as PEDOT. Suitable intermediate layer materials, overlayer materials, filler materials and adhesive materials include silicon oxides, coatable organic materials, optical adhesives, and so forth.

In exemplary constructions of the present disclosure, layer stacks can be provided on a substrate, the layer stacks including an intermediate layer disposed on the substrate and a transparent conductor layer disposed on the intermediate layer, with an optional adhesive or filler material disposed over the layer stacks and optionally over the exposed portions of the substrate as well. Exemplary material selections may yield the following refractive indices for each respective component: substrate index of about 1.4 to 1.8 (for example about 1.67 for a PET); intermediate layer index of about 1.4 to 1.6 (for example about 1.45 for $SiO_2$); transparent conductor index of about 1.7 to 2.2 (for example about 2.0 for ITO); and filler material index of about 1.4 to 1.8 (for example about 1.5 for an optical adhesive). In exemplary constructions, the intermediate layer refractive index is less than that of the transparent conductor and can be less than that of the substrate, and the filler material refractive index is close to that of the substrate and/or that of the intermediate layer.

Touch sensitive overlays that can suitably utilize constructions of the present disclosure include those that utilize a patterned transparent conductor as the sensing element(s). These include discrete matrix touch sensors (such as disclosed in U.S. Pat. Nos. 6,813,957; 6,762,752; 6,188,391; 5,844,506; 5,386,219; and 5,007,085, as well as International Publications WO 01/27868, WO 01/100074, and WO 01/52416, each of which is wholly incorporated into this document), discrete bar sensors (such as disclosed in U.S. Pat. No. 5,650,597 and U.S. Patent Publication 2003/0103043, each of which is wholly incorporated into this document), discrete pad sensors (such as disclosed in U.S. Pat. No. 4,789,767, which is wholly incorporated into this document), and other discrete sensing element sensors, as well as electrically continuous patterned sensing layer sensors (such as disclosed in U.S. Pat. No. 4,198,539, which is wholly incorporated into this document). These types of sensors can be advantageously used in capacitive, projected capacitive, and/or inductive sensing technologies, and can be used in a variety of applications that benefit from on-screen input including hand-held devices (e.g., palm top computers, personal organizers, mobile phones, music players, etc.), tablet computers, automotive navigation system displays, touch input monitors, public information kiosks, automated teller machines, gaming and entertainment devices, and so forth.

Figure 1:
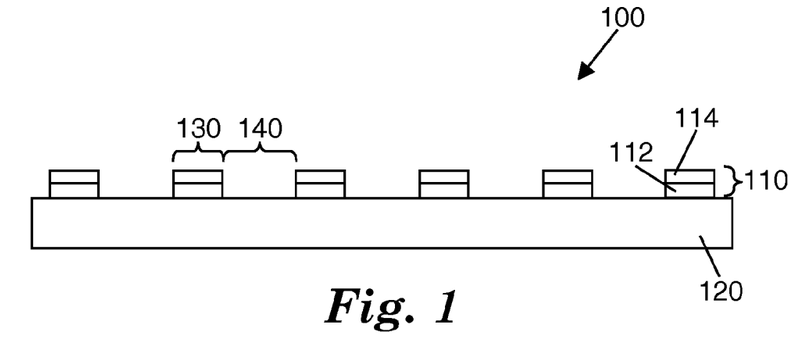
FIG. 1 is a schematic side view of a sensor construction according to the present disclosure.

FIG. 1 shows a schematic side view of a sensor construction 100 that includes a plurality of layer stacks 110 arranged on a substrate 120. Layer stacks 110 include an intermediate layer 112 and a transparent conductor layer 114. The layer stacks 110 are configured so that the transmission of visible light through areas 130 covered by the stacks 110 is nearly that of the transmission of visible light through areas 140 exposed by the stacks 110. While layers 112 and 114 are shown to have equal lateral dimensions, this need not be the circumstance, so long as their patterns coincide. The lateral dimensions of the layers in a layer stack may vary relative to one another either by accident (e.g., as a result of imprecise patterning or alignment) or by design. For example, it may be desirable for the intermediate layer 112 to be wider than the transparent conductor layer 114 so that the intermediate layer 112 laterally extends beyond the transparent conductor layer 114. This may ensure that there is no contact between the transparent conductor layer 114 and the underlying substrate in cases where such contact is preferably avoided.

The layer stacks can be patterned in any suitable manner that results in coincident patterns of each of the layers. For example, each of the layers can be deposited sequentially over the substrate surface, and then portions of the stack can be removed from the substrate to form the pattern. To remove the portions, various techniques may be employed such as photolithography, laser ablation, etching, patterned lift-off, and the like. Suitable patterned lift-off processes include those disclosed in U.S. Pat. Nos. 4,714,631 and 4,895,630, which are wholly incorporated into this document. These processes involve patterning an undercoating onto areas of a substrate that are to be left uncovered by the layer stacks (i.e., in a pattern that is the inverse of the desired layer stack pattern), forming the stack of layers over the entire area of interest, and washing the substrate to remove the stack of layers from the patterned areas to leave the desired pattern of layer stacks. Suitable ablation methods may include those disclosed in U.S. Pat. No. 6,689,544, which is wholly incorporated into this document. Suitable etching methods may include those disclosed in U.S. Pat. No. 6,838,013, which is wholly incorporated into this document.

Alternatively, each of the layers can be patterned separately, for example by deposition through a mask, by direct printing (e.g., screen printing, ink jet printing, or the like), by separate etching and/or lithography steps for each layer, by patterned transfer, or any suitable combination. To form coincident patterns of the layers, separate patterning will generally involve alignment steps for each new layer of the stack.

Figure 2:
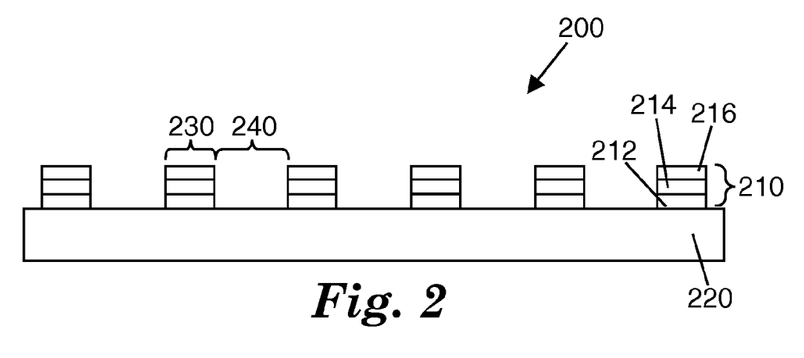
FIG. 2 is a schematic side view of another sensor construction according to the present disclosure.

FIG. 2 shows a schematic side view of another sensor construction 200 that includes a plurality of layer stacks 210 arranged on a substrate 220. Layer stacks 210 include an intermediate layer 212, a transparent conductor layer 214 on the intermediate layer 212, and an overlayer 216 arranged on the transparent conductor layer 214. FIG. 2 also indicates examples of areas 230 covered by the stacks 210 and areas 240 exposed by the stacks 210.

Figure 3:
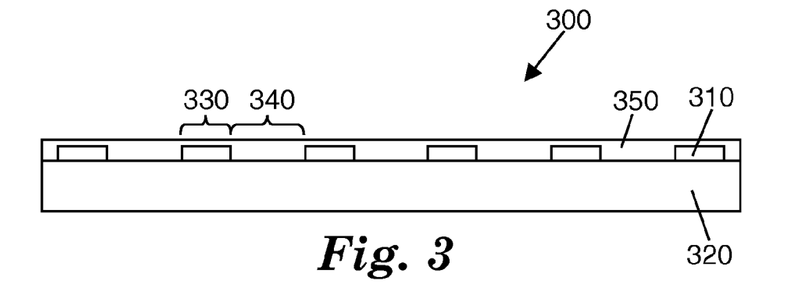
FIG. 3 is a schematic side view of another sensor construction according to the present disclosure.

FIG. 3 shows a schematic side view of another sensor construction 300 that includes a plurality of layer stacks 310 arranged on a substrate 320. The layer stacks 310 can be of any suitable construction, for example like that of stacks 110 shown in FIG. 1 or stacks 210 shown in FIG. 2. FIG. 3 additionally indicates a filler coating 350 that is disposed over the areas 330 covered by the stacks and the areas 340 exposed by the stacks. The filler material can be any suitable material, for example a material whose refractive index matches the refractive index of the substrate (e.g., for reducing interfacial reflections in the areas exposed by the stacks), or an adhesive such as an optically clear adhesive (e.g., for bonding to another element, not shown, such as a substrate, display device, protective film, optical film, and the like).

Figure 4:
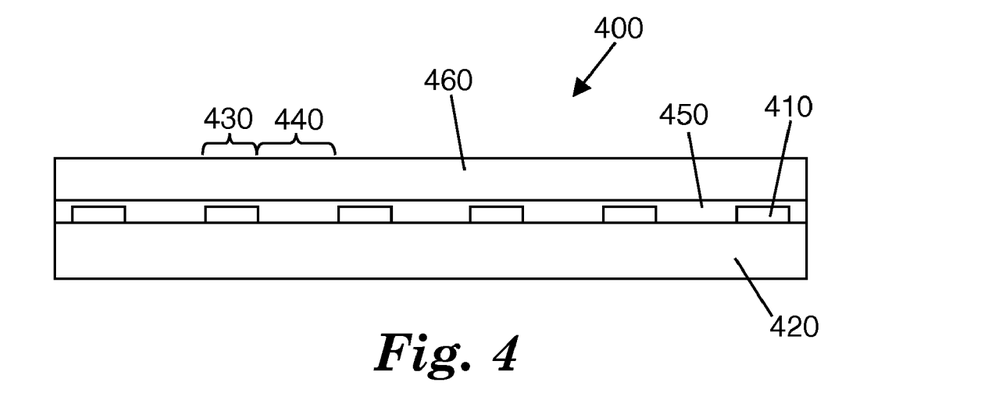
FIG. 4 is a schematic side view of another sensor construction according to the present disclosure.

FIG. 4 shows a schematic side view of another sensor construction 400 that includes a plurality of layer stacks 410 arranged on a substrate 420 to form areas 430 covered by the stacks 410 and areas 440 exposed by the stacks 410, the stacks 410 being of any suitable construction according to the present disclosure. A second substrate 460 is disposed over the arrangement of layer stacks 410 and held together with the construction 400 via an adhesive 450 such as an optical adhesive. Substrate 460 can provide protection, rigidity, optical functionality (e.g., light control, polarization, retardation, etc.), and so forth. Substrate 460 may also provide an additional surface onto which additional layer stacks can be formed. For example, layer stacks including transparent conductive layer, i.e. similar to stacks 410, can be formed on substrate 460 and disposed in a direction orthogonal to the direction of stacks 410 in order to construct a grid of sensing elements for a matrix touch screen.

Figure 5:
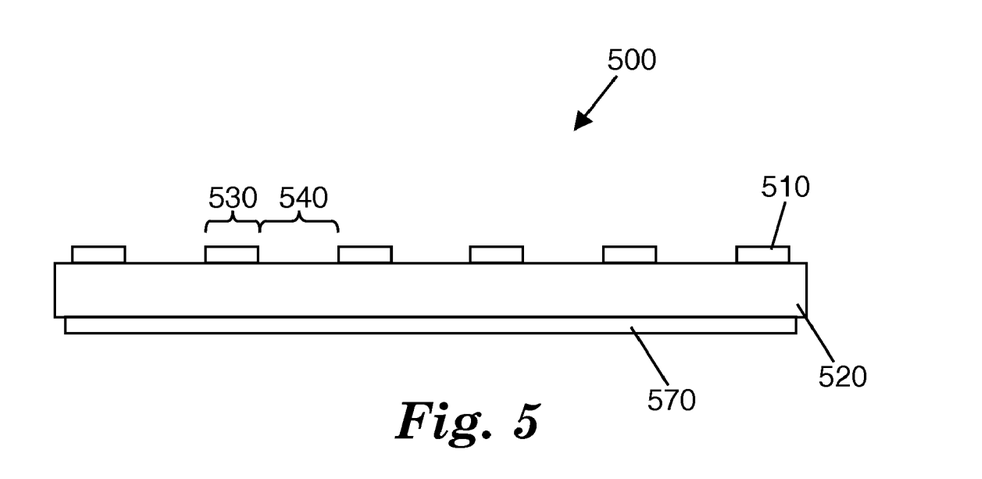
FIG. 5 is a schematic side view of another sensor construction according to the present disclosure.

FIG. 5 shows a schematic side view of another sensor construction 500 that includes a first plurality of layer stacks 510 disposed on a first side of a substrate 520, and a second plurality of layer stacks 570 disposed on the opposite side of the substrate 520 and oriented differently than the first plurality of layer stacks, for example orthogonally. Layer stacks 510 are constructed in accordance with the present disclosure to reduce the difference between light transmission through the areas 530 covered by the stacks and the areas 540 exposed by the stacks. Layer stacks 570 can be similarly constructed. Substrate 520 can serve to provide support structure as well as to electrically insulate the sensing elements formed by layer stacks 520 and the sensing elements formed by layer stacks 570.

Figure 6:
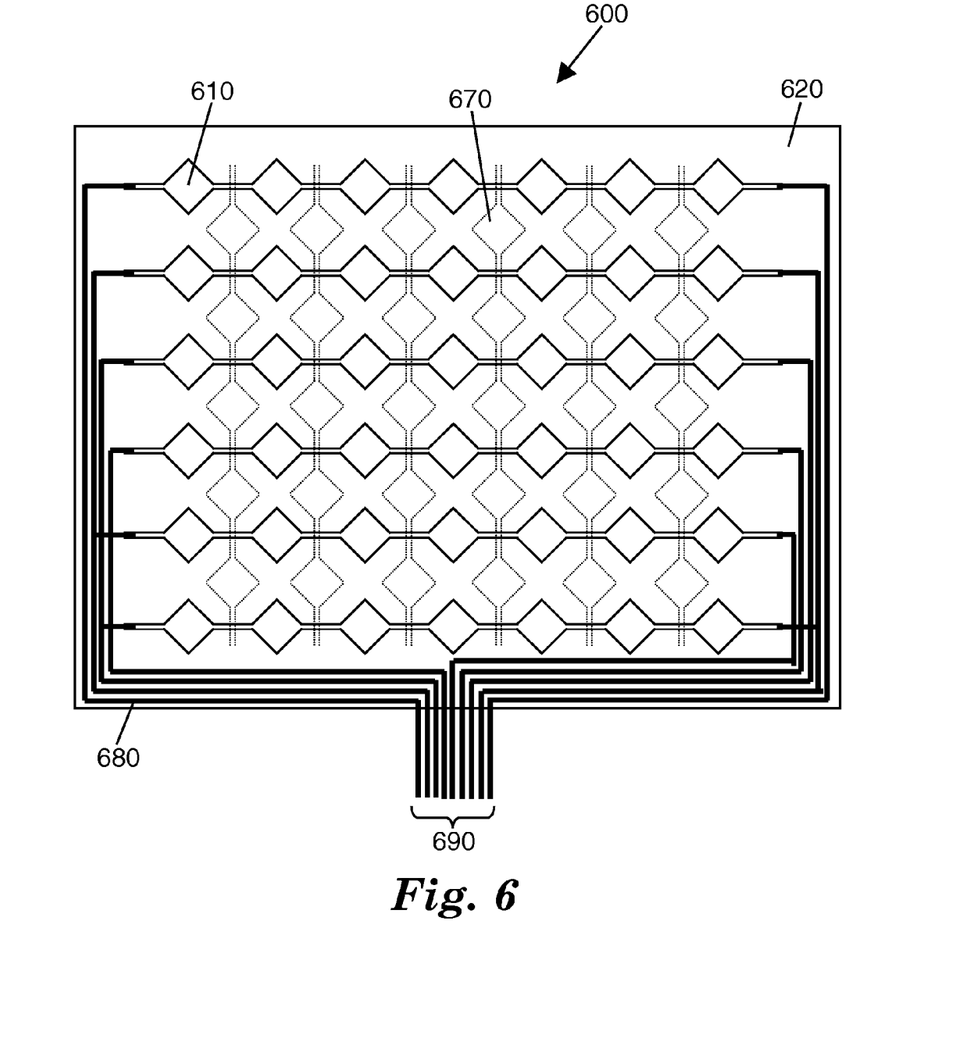
FIG. 6 is a schematic plan view of another sensor construction according to the present disclosure.

FIG. 6 shows a schematic plan view of a sensor layout that may be useful in sensors of the present disclosure. Sensor 600 includes a first plurality of sensing elements 610 disposed on one side of a substrate 620 and a second plurality of sensing elements 670 disposed on the opposite side of the substrate 620 and oriented orthogonally to the first plurality of sensing elements 610. Each of sensing elements 610 and 670 are shown as a series of diamond shapes joined by relatively narrow traces, but can be provided in any suitable configuration such as uniform width bars. In the layout shown in FIG. 6, the diamond shapes in the first plurality of sensing elements 610 line up so that diamond-shaped interstices, or windows, are formed by each set of four neighboring diamonds. The second plurality of sensing elements 670 are shown arranged so that the diamonds of the vertical traces 670 fit within the windows formed by the diamonds of the horizontal traces 610, for example to allow for more effective coupling of touch objects to vertical sensing elements that are positioned underneath horizontal sensing elements in the sensor construction. In such configurations having a second set of diamond-shaped sensing elements under the first, the second set of diamonds can be made somewhat larger than the first to increase the coupling area in compensation for the increased distance (and thus lower coupling strength) between the touch input and the second set of sensing elements. The sensing elements connect to a series of lead lines 680 that are arranged to help identify which vertical trace(s) and horizontal trace(s) are closest to the touch input. As shown, the sensing elements are connected to lead lines on both ends, but it is understood that embodiments where the sensing elements are connected to lead lines on just one end are also contemplated in the present invention. The lead lines 680 are routed around the perimeter of the sensor 600, and are gathered at a point where they can be connected to an electronic tail 690. The electronic tail 690 can be connected on the other end to controller electronics (not shown) for interpreting the touch signals and determining touch position.

Figures 7A, 7B:
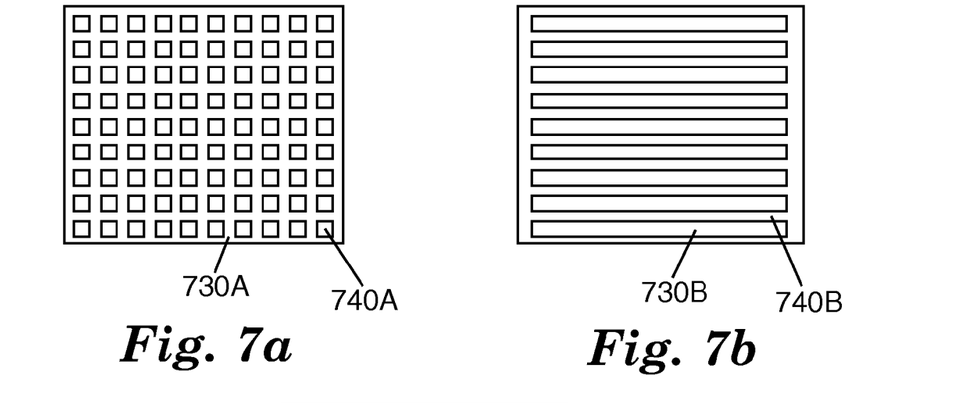
FIGS. 7(a)-(c) are schematic plan views of sensing element arrangements.
Figure 7C:
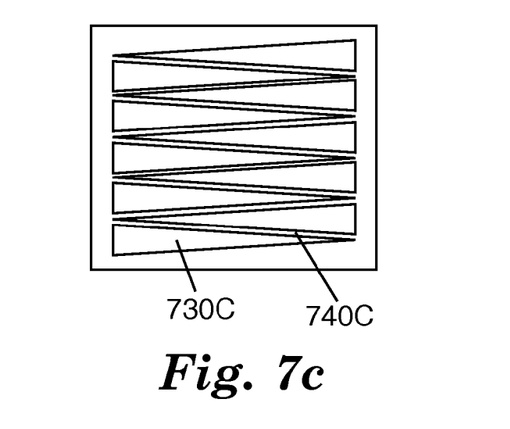

FIG. 7 shows additional non-limiting examples of various layer stack patterns that may be useful when constructing touch sensors having patterned layer stacks according to the present invention. FIG. 7(a) shows a pattern of layer stacks 730A that could include a transparent conductor layer that is electrically continuous across the entire active touch area. Uncovered areas 740A are shown as a regular array of squares, but can be arranged in any desirable configuration. FIG. 7(b) shows a layer stack pattern arranged in a linear array of parallel bars 730B, with the uncovered areas 740B separating the bars. FIG. 7(c) shows a layer stack pattern arranged in a linear array of triangular bars 730C, with the uncovered areas 740C separating the triangular bars. Other arrangements are possible as will be appreciated by those of skill in the art.

Figure 8:
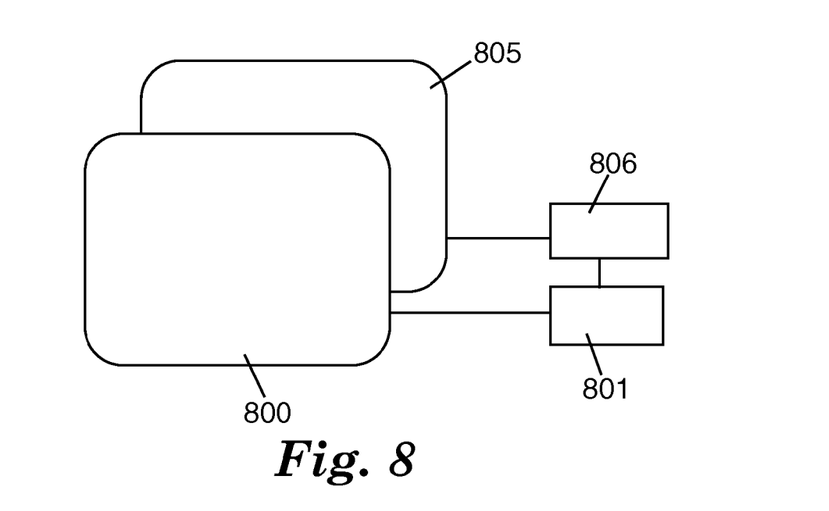
FIG. 8 is a schematic representation of a touch sensor system.

FIG. 8 shows a schematic diagram of a touch sensor system that includes a sensor 800 according to the present disclosure disposed over a display device 805 so that the display device is viewable through the sensor 800. Sensor 800 is coupled to controller electronics 801 that communicate signals to and from the sensor so that information related to a touch input on the sensor, such as touch location, can be determined. The display device 805 can be coupled to a processing unit 806, such as a computer's CPU, that communicates what should be shown on the display device. In other embodiments, the display device may be a static (i.e., non-changeable) display so that connection to a processing unit is not necessary. Controller electronics 801 and processing unit 806 can be coupled so that touch input information can be used by the computer (not shown) and the results displayed on the display device.

Figure 9:
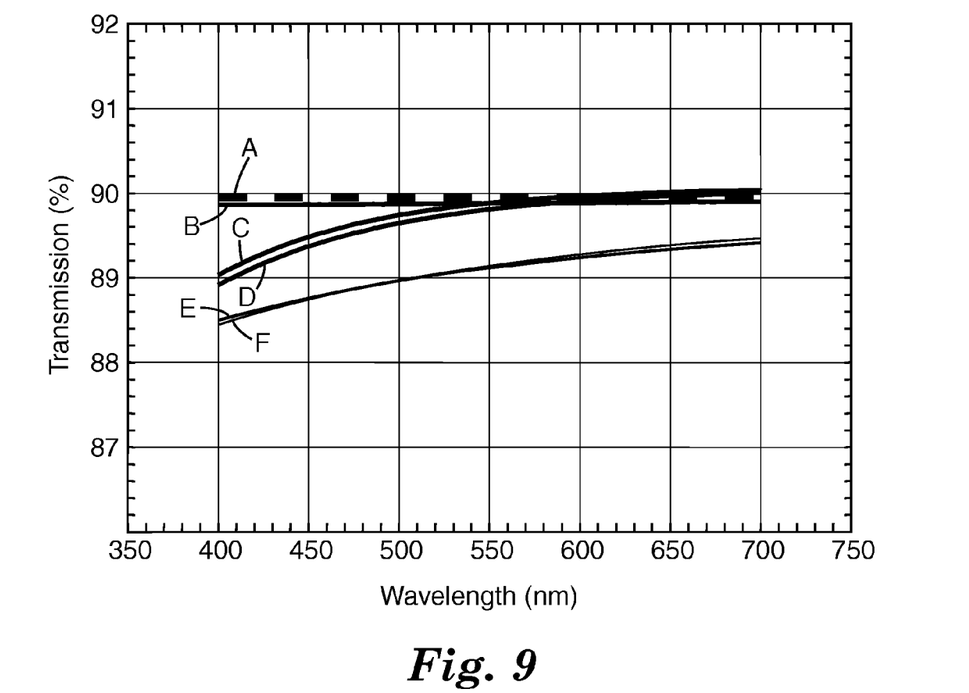
FIG. 9 is a plot of transmission over the visible spectrum for various sensor constructions including constructions according to the present disclosure and comparative constructions.

Optical modeling was used to compare the internal transmission of visible light for layer stack constructions of the present disclosure and certain comparative constructions. Each construction and comparative construction was also compared to a similar control construction that did not include a transparent conductor pattern. The difference between the transmission of each layer stack construction and the corresponding control construction indicates the relative level of distinguishability of areas covered by a layer stack versus areas not covered by a layer stack. The following constructions were evaluated, the layers designated in order for each construction:

Construction A (Control):
1.67 refractive index layer (to simulate a PET substrate)
1.5 refractive index layer (to simulate an optical adhesive)

Construction B (Control):
1.67 refractive index layer (to simulate a PET substrate)
30 nm thick 1.45 refractive index layer (to simulate silicon oxide)
1.5 refractive index layer (to simulate an optical adhesive)

Construction C:
1.67 refractive index layer (to simulate a PET substrate)
30 nm thick 1.45 refractive index layer (to simulate silicon oxide)
20 nm thick 2.0 refractive index layer (to simulate ITO)
30 nm thick 1.45 refractive index layer (to simulate silicon oxide)
1.5 refractive index layer (to simulate an optical adhesive)

Construction D:
1.67 refractive index layer (to simulate a PET substrate)
30 nm thick 1.46 refractive index layer (to simulate silicon oxide)
20 nm thick 2.0 refractive index layer (to simulate ITO)
1.5 refractive index layer (to simulate an optical adhesive)

Construction E (Comparative):
1.67 refractive index layer (to simulate a PET substrate)
20 nm thick 2.0 refractive index layer (to simulate ITO)
1.5 refractive index layer (to simulate an optical adhesive)

Construction F (Comparative):
1.67 refractive index layer (to simulate a PET substrate)
20 nm thick 2.0 refractive index layer (to simulate ITO)
30 nm thick 1.45 refractive index layer (to simulate silicon oxide)
1.5 refractive index layer (to simulate an optical adhesive)

FIG. 9 shows internal transmission as a function of wavelength over the visible spectrum for each of these constructions. Comparing each of Constructions C and D to Construction A indicates how the internal transmission in areas covered by layer stacks compares to the internal transmission in areas left exposed by layer stacks for sensor constructions having a pattern of the corresponding layer stack structure. For each of Constructions C and D, the maximum difference in internal transmission of visible light between covered areas and exposed areas is about 1% or less, and the average difference in internal transmission over the visible spectrum is about 0.5% or less, preferably 0.3% or less. When the silicon oxide layer between the PET substrate and ITO conductive layer is removed from the layer stacks of Constructions C and D, the resulting constructions are exemplified by Comparative Constructions F and E, respectively. As can be seen from FIG. 9, the internal transmission for Comparative Constructions F and E are significantly lower than Constructions C and D over the entire visible spectrum. As such, constructions of the present disclosure can result in improved overall transmission of touch sensitive overlays, and in reduced visibility of transparent conductor patterns due to a reduction in the difference between light transmission through the sensor areas covered by layer stacks versus areas uncovered by layer stacks.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A transparent touch screen construction, comprising:
a substrate;
a plurality of layer stacks disposed on the substrate leaving areas of the substrate exposed and areas of the substrate covered by the stacks, each layer stack comprising a transparent conductor layer and an intermediate layer, the intermediate layer having a first major surface in contact with the substrate and a second major surface in contact with the transparent conductor layer, the intermediate layer having an index of refraction that is less than that of the transparent conductor layer and less than that of the substrate;
a plurality of lead lines electrically connected to the transparent conductor layers and configured for connecting to controller electronics adapted to determine touch input information based on signals received when a touch input is coupled to the transparent conductors; and
an adhesive layer disposed on the transparent conductor layer of each layer stack in the areas covered by the stacks, the adhesive layer also being disposed on the substrate in the areas exposed by the stacks, the adhesive layer having a different material composition than the intermediate layer;
wherein a thickness of the transparent conductor layer and a thickness of the intermediate layer are tailored to provide a difference in visible light transmission through the areas covered by the stacks and the areas exposed by the stacks that has a maximum over a range from 400 to 700 nm of about 1% or less and an average over the 400 to 700 nm range of about 0.5% or less.

2. The transparent touch screen construction of claim 1, wherein the substrate is plastic.

3. The transparent touch screen construction of claim 1, wherein the substrate is PET.

4. The transparent touch screen construction of claim 1, wherein the intermediate layer is silicon oxide.

5. The transparent touch screen construction of claim 1, wherein the transparent conductor layer is indium tin oxide.

6. The transparent touch screen construction of claim 1, wherein the substrate is a first substrate and the adhesive layer is an optical adhesive layer, and further comprising a second substrate having an interior surface attached to the optical adhesive layer and an exterior surface opposing the interior surface.

7. The transparent touch screen construction of claim 6, wherein the second substrate is PET.

8. The transparent touch screen construction of claim 6, wherein the second substrate is glass.

9. The transparent touch screen construction of claim 6, wherein the second substrate further comprises a plurality of touch sensitive elements arranged in a pattern.

10. The transparent touch screen construction of claim 1, wherein each of the areas covered by the stacks has a visible light transmission that changes by no more than about 1% over the range from 400 to 700 nm, and wherein each of the areas exposed by the stacks has a visible light transmission that changes by no more than about 1% over the range from 400 to 700 nm.

11. A transparent touch screen construction, comprising:
a substrate;
a plurality of layer stacks disposed on the substrate leaving areas of the substrate exposed and areas of the substrate covered by the stacks, each layer stack comprising a transparent conductor layer and an intermediate layer, the intermediate layer having a first major surface in contact with the substrate and a second major surface in contact with the transparent conductor layer, the intermediate layer having an index of refraction that is less than that of the transparent conductor layer and less than that of the substrate, each stack further comprising an overlayer in contact with the transparent conductor layer so that the transparent conductor layer resides between the intermediate layer and the overlayer, the overlayer also being disposed on the substrate in the areas exposed by the stacks, the overlayer having an index of refraction that is less than that of the transparent conductor layer;

a plurality of lead lines electrically connected to the transparent conductor layers and configured for connecting to controller electronics adapted to determine touch input information based on signals received when a touch input is coupled to the transparent conductors;

an adhesive layer disposed on the transparent conductor layer disposed on the overlayer of each layer stack in the areas covered by the stacks, the adhesive layer also being disposed on the substrate in the areas exposed by the stacks, the adhesive layer having a different material composition than the intermediate layer;

wherein a thickness of the transparent conductor layer and a thickness of the intermediate layer are tailored to provide a difference in visible light transmission through the areas covered by the stacks and the areas exposed by the stacks that has a maximum over a range from 400 to 700 nm of about 1% or less and an average over the 400 to 700 nm range of about 0.5% or less.

12. The transparent touch screen construction of claim 11, wherein the substrate is plastic, and the transparent conductor layer is indium tin oxide.

13. The transparent touch screen construction of claim 12, wherein the substrate has a refractive index of about 1.6 to 1.7, the intermediate layer has a refractive index of about 1.4 to 1.6, the transparent conductor layer has a refractive index of about 1.8 to 2.1, and the adhesive layer is an optical adhesive layer having a refractive index of about 1.4 to 1.8.

14. The transparent touch screen construction of claim 11, wherein the substrate has a refractive index of about 1.6 to 1.7, the intermediate layer has a refractive index of about 1.4 to 1.6, the transparent conductor layer has a refractive index of about 1.8 to 2.1, and the adhesive layer is an optical adhesive layer having a refractive index of about 1.4 to 1.8.

15. The transparent touch screen construction of claim 11, wherein the substrate is a first substrate and the adhesive layer is an optical adhesive layer, and further comprising a second substrate having an interior surface attached to the optical adhesive layer and an exterior surface opposing the interior surface.

16. The transparent touch screen construction of claim 15, wherein the second substrate is PET.

17. The transparent touch screen construction of claim 15, wherein the second substrate is glass.

18. The transparent touch screen construction of claim 15, wherein the second substrate further comprises a plurality of touch sensitive elements arranged in a pattern.

19. The transparent touch screen construction of claim 18, wherein the plurality of touch sensitive elements of the second substrate have a layer construction that is the same as the plurality of layer stacks of the first substrate.

20. The transparent touch screen construction of claim 11, wherein each of the areas covered by the stacks has a visible light transmission that changes by no more than about 1% over the range from 400 to 700 nm, and wherein each of the areas exposed by the stacks has a visible light transmission that changes by no more than about 1% over the range from 400 to 700 nm.

21. A method for reducing the visibility of a patterned transparent conductor in a touch screen, comprising:

providing a substrate covered with a transparent conductor layer and an intermediate layer, the intermediate layer having a first major surface in contact with the substrate and a second major surface in contact with the transparent conductor layer, the intermediate layer having an index of refraction that is less than that of the transparent conductor layer and less than that of the substrate;

patterning the transparent conductor layer; and patterning the intermediate layer to coincide with the patterned transparent conductor layer to provide a plurality of layer stacks on the substrate leaving areas of the substrate exposed by the stacks and areas of the substrate covered by the stacks; and disposing an adhesive material over the plurality of layer stacks such that the adhesive material covers both the areas of the substrate covered by the stacks and the areas of the substrate exposed by the stacks, the adhesive material having an index of refraction that is less than that of the patterned transparent conductor layer, the adhesive material also having a different material composition than the intermediate layer;

wherein the patterning is carried out and thicknesses of the intermediate layer and the patterned transparent conductor are tailored such that a difference in visible light transmission through the areas covered by the stacks and the areas exposed by the stacks has a maximum over a range from 400 to 700 nm of about 1% or less and an average over the 400 to 700 nm range of about 0.5% or less.

22. The method of claim 21, wherein the adhesive material comprises an optical adhesive.

23. The method of claim 22, further comprising the step of disposing a second substrate over the adhesive material.

24. The method of claim 21, wherein the steps of patterning the transparent conductor layer and patterning the intermediate layer occur simultaneously.

25. The method of claim 21, wherein the step of patterning the intermediate layer occurs prior to the step of patterning the transparent conductor layer.

26. The method of claim 21, wherein the patterning is carried out and thicknesses of the intermediate layer and the patterned transparent conductor are tailored such that each of the areas covered by the stacks has a visible light transmission that changes by no more than about 1% over the range from 400 to 700 nm, and wherein each of the areas exposed by the stacks has a visible light transmission that changes by no more than about 1% over the range from 400 to 700 nm.

27. A touch input system, comprising:

a touch screen overlay comprising a substrate on which is formed a plurality of layer stacks, the plurality of layer stacks being arranged so as to leave areas of the substrate exposed by the stacks and areas of the substrate covered by the stacks, the plurality of layer stacks including a transparent conductor sensing element pattern disposed on the substrate in an active area of the touch screen, and an intermediate layer pattern coincident with the transparent conductor sensing element pattern and having a first major surface in contact with the substrate and a second major surface in contact with the transparent conductor sensing element pattern, the intermediate layer having an index of refraction that is less than that of the transparent conductor and less than that of the substrate, the touch screen overlay also including an adhesive material that covers both the areas of the substrate covered by the stacks and the areas of the substrate exposed by the stacks, the adhesive material having an index of refraction that is less than that of the transparent conductor sensing element pattern, the adhesive material also having a different material composition than the intermediate layer;

controller electronics coupled to the transparent conductor sensing element pattern and configured to receive signals from the touch screen overlay due to a touch input in the active area and to determine information related to the touch input from the received signals; and a display device viewable through the touch screen overlay;

wherein a thickness of the transparent conductor sensing element pattern and a thickness of the intermediate layer pattern are tailored to provide a difference in visible light transmission of the touch screen overlay through the areas covered by the stacks and the areas exposed by the stacks that has a maximum over a range from 400 to 700 nm of about 1% or less and an average over the 400 to 700 nm range of about 0.5% or less.

28. The system of claim 27, wherein the touch screen overlay has a visible light transmission, in each of the areas covered by the stacks, that changes by no more than about 1% over the range from 400 to 700 nm, and wherein the touch screen overlay has a visible light transmission, in each of the areas exposed by the stacks, that changes by no more than about 1% over the range from 400 to 700 nm.

* * * * *

UNITED STATES PATENT AND TRADEMARK OFFICE
CERTIFICATE OF CORRECTION

PATENT NO. : 8,264,466 B2
APPLICATION NO. : 11/278166
DATED : September 11, 2012
INVENTOR(S) : Jonathan P Maag et al.

It is certified that error appears in the above-identified patent and that said Letters Patent is hereby corrected as shown below:

Column 3
Line 34, delete "terapthalate"
and insert -- terephthalate -- therefor.

Column 4
Line 7, delete "01/100074"
and insert -- 02/100074 -- therefor.

Signed and Sealed this
Twenty-sixth Day of February, 2013

Teresa Stanek Rea
*Acting Director of the United States Patent and Trademark Office*